US012585281B2

(12) United States Patent
Jenzowsky

(10) Patent No.: US 12,585,281 B2
(45) Date of Patent: Mar. 24, 2026

(54) METHOD AND SYSTEM FOR AUTONOMOUS DRIVING OF A VEHICLE

(71) Applicant: Ford Global Technologies, LLC, Dearborn, MI (US)

(72) Inventor: Stefan Jenzowsky, Berlin (DE)

(73) Assignee: Ford Global Technologies, LLC, Dearborn, MI (US)

( * ) Notice: Subject to any disclaimer, the term of this patent is extended or adjusted under 35 U.S.C. 154(b) by 246 days.

(21) Appl. No.: 17/201,412

(22) Filed: Mar. 15, 2021

(65) Prior Publication Data

US 2021/0284193 A1     Sep. 16, 2021

(30) Foreign Application Priority Data

Mar. 16, 2020     (DE) ..................... 10 2020 107 108.6

(51) Int. Cl.
　*G05D 1/00*　　　(2024.01)
　*B60W 60/00*　　(2020.01)
　　　(Continued)

(52) U.S. Cl.
　CPC ......... *G05D 1/0297* (2013.01); *B60W 60/001* (2020.02); *G06F 18/214* (2023.01);
　　　(Continued)

(58) Field of Classification Search
　CPC ........ G05D 1/0297; G05D 2201/0213; B60W 60/001; B60W 2420/42; B60W 2420/52;
　　　(Continued)

(56) References Cited

U.S. PATENT DOCUMENTS 3,506,956 A * 4/1970 Harris ...................... G08B 7/06
　　　　　　　　　　　　　　　　　　　　340/13.31
8,457,827 B1 * 6/2013 Ferguson .............. B60W 30/16
　　　　　　　　　　　　　　　　　　　　701/28
(Continued)

FOREIGN PATENT DOCUMENTS

CN　　　103108796 A　　5/2013
CN　　　105916758 A　　8/2016
　　　　　　(Continued)

OTHER PUBLICATIONS

Machine Translation of KR 20130062540 A obtained from Clarivate Analytics on Feb. 7, 2025 (Year: 2013).*
(Continued)

*Primary Examiner* — Fadey S. Jabr
*Assistant Examiner* — Michael J Herrera
(74) *Attorney, Agent, or Firm* — Burris Law, PLLC

(57)　　　　　ABSTRACT

The disclosure relates to a method for remote-controlled autonomous driving of a vehicle (201) having the steps of capturing the vehicle (201) with the aid of at least one sensor, in particular camera, arranged in the surroundings of the vehicle (201), determining a movement path for the vehicle (201) by a processing device (501) located outside the vehicle, transmitting the movement path and/or control commands regarding the movement path to the vehicle (201), and implementing the movement path and/or the control commands in the vehicle (201), in order to move the vehicle (201) in accordance with the movement path.

20 Claims, 1 Drawing Sheet

(51) Int. Cl.
 *G06F 18/214* (2023.01)
 *G06N 3/08* (2023.01)
 *G06V 20/56* (2022.01)
 *G06V 20/58* (2022.01)
(52) U.S. Cl.
 CPC .............. *G06N 3/08* (2013.01); *G06V 20/586*
 (2022.01); *G06V 20/588* (2022.01); *B60W*
 *2420/403* (2013.01); *B60W 2420/408*
 (2024.01)
(58) Field of Classification Search
 CPC ........ B60W 30/06; G06F 18/214; G06N 3/08;
 G06V 20/586; G06V 20/588; B62D
 15/0285; G08G 1/168
 See application file for complete search history.

(56) References Cited

U.S. PATENT DOCUMENTS

| | | | | |
|---|---|---|---|---|
| 9,164,511 | B1 * | 10/2015 | Ferguson | B60W 40/06 |
| 9,201,424 | B1 * | 12/2015 | Ogale | G06T 7/80 |
| 9,701,305 | B2 | 7/2017 | Paul et al. | |
| 9,914,333 | B2 * | 3/2018 | Shank | B60D 1/58 |
| 10,387,754 | B1 * | 8/2019 | Kim | G06V 10/82 |
| 11,468,285 | B1 * | 10/2022 | Tang | G06V 10/255 |
| 2005/0030378 | A1 * | 2/2005 | Stiller | G06T 7/85 |
| | | | | 348/E7.086 |
| 2014/0372016 | A1 | 12/2014 | Buchholz et al. | |
| 2015/0178970 | A1 * | 6/2015 | Pham | G06T 5/002 |
| | | | | 382/190 |
| 2016/0259329 | A1 * | 9/2016 | High | H04N 5/77 |
| 2017/0131719 | A1 * | 5/2017 | Micks | B60W 30/09 |
| 2017/0206426 | A1 * | 7/2017 | Schrier | G06V 10/82 |
| 2017/0269599 | A1 * | 9/2017 | Ansari | G06V 20/58 |
| 2017/0308095 | A1 * | 10/2017 | Irion | G05D 1/0282 |
| 2017/0330455 | A1 * | 11/2017 | Kikuchi | G06V 20/582 |
| 2017/0344882 | A1 * | 11/2017 | Ambrose | G06N 3/045 |
| 2018/0025632 | A1 * | 1/2018 | Breed | G06T 7/70 |
| | | | | 701/93 |
| 2018/0032915 | A1 * | 2/2018 | Nagaraju | G06V 10/95 |
| 2018/0046198 | A1 * | 2/2018 | Nordbruch | G05D 1/0282 |
| 2018/0095465 | A1 | 4/2018 | Gao et al. | |
| 2018/0130355 | A1 * | 5/2018 | Zia | G06V 10/772 |
| 2018/0247535 | A1 * | 8/2018 | Mielenz | G06T 7/248 |
| 2018/0253108 | A1 * | 9/2018 | Heinla | G05D 1/0274 |
| 2018/0259353 | A1 * | 9/2018 | Tsurumi | G01S 13/867 |
| 2018/0308365 | A1 * | 10/2018 | Liu | G08C 23/04 |
| 2019/0025773 | A1 * | 1/2019 | Yang | G06F 18/214 |
| 2019/0047558 | A1 * | 2/2019 | Relihan | G08G 1/09675 |
| 2019/0049997 | A1 * | 2/2019 | Battles | G08G 1/166 |
| 2019/0138829 | A1 * | 5/2019 | Gurghian | H04L 67/12 |
| 2019/0156121 | A1 * | 5/2019 | Kucharski | G06V 20/54 |
| 2019/0163996 | A1 * | 5/2019 | Pitale | G08G 1/0129 |
| 2019/0185019 | A1 * | 6/2019 | Cho | B60W 60/001 |
| 2019/0239041 | A1 * | 8/2019 | Kume | H04W 4/02 |
| 2019/0258885 | A1 * | 8/2019 | Piette | G06V 10/143 |
| 2019/0261566 | A1 * | 8/2019 | Robertson | A01D 46/28 |
| 2019/0304310 | A1 * | 10/2019 | Tao | G01S 13/931 |
| 2019/0384294 | A1 * | 12/2019 | Shashua | G01C 21/3623 |
| 2020/0050865 | A1 * | 2/2020 | Lehn | G08G 1/096758 |
| 2020/0064860 | A1 | 2/2020 | Kim et al. | |
| 2021/0270625 | A1 * | 9/2021 | Nilsson | G01C 21/3602 |

FOREIGN PATENT DOCUMENTS

| | | | |
|---|---|---|---|
| CN | 106846870 | A | 6/2017 |
| CN | 107735824 | A | 2/2018 |
| CN | 109204120 | A | 1/2019 |
| CN | 110874945 | A | 3/2020 |
| DE | 289364 | A5 | 4/1991 |
| DE | 102005029336 | A1 | 4/2006 |
| DE | 102008027692 | A1 | 12/2009 |
| DE | 102012008858 | A1 | 11/2012 |
| DE | 102011087459 | A1 | 6/2013 |
| DE | 102012222562 | A1 | 6/2014 |
| DE | 102009051463 | B4 | 8/2014 |
| DE | 102013003683 | A1 | 9/2014 |
| DE | 102013213754 | A1 | 1/2015 |
| DE | 102014224075 | A1 | 6/2016 |
| DE | 102015002405 | A1 | 8/2016 |
| DE | 102015007531 | B3 | 9/2016 |
| DE | 102016120422 | A1 | 5/2017 |
| DE | 102016200794 | | 7/2017 |
| DE | 102018116515 | | 1/2020 |
| DE | 102018116515 | A1 * | 1/2020 ............. G01S 11/12 |
| JP | 2008176663 | A * | 7/2008 |
| JP | 2018508082 | A | 3/2018 |
| KR | 20130062540 | A * | 6/2013 |
| WO | WO-2011154242 | A1 | 12/2011 |
| WO | WO-2016128203 | A1 | 8/2016 |

OTHER PUBLICATIONS

Machine Translation of JP 2008176663 A obtained from Clarivate Analytics on Feb. 7, 2025 (Year: 2008).*

Machine Translation of DE-102018116515-A1 obtained from Clarivate Analytics on Dec. 10, 2025 (Year: 2020).*

An, Kyounghwan et al., "Cooperative vehicle control system based on fusion map." 2012 7th International Conference on Computing and Convergence Technology (Iccct). IEEE, 2012.

Boonsim, N. et al. "Car make and model recognition under limited lighting conditions at night." Pattern Analysis and Applications 20.4 (2017): 1195-1207.

Office Action issued in German counterpart application No. 102020107108.6, on Jun. 5, 2025, and English translation thereof, 8 pages.

* cited by examiner

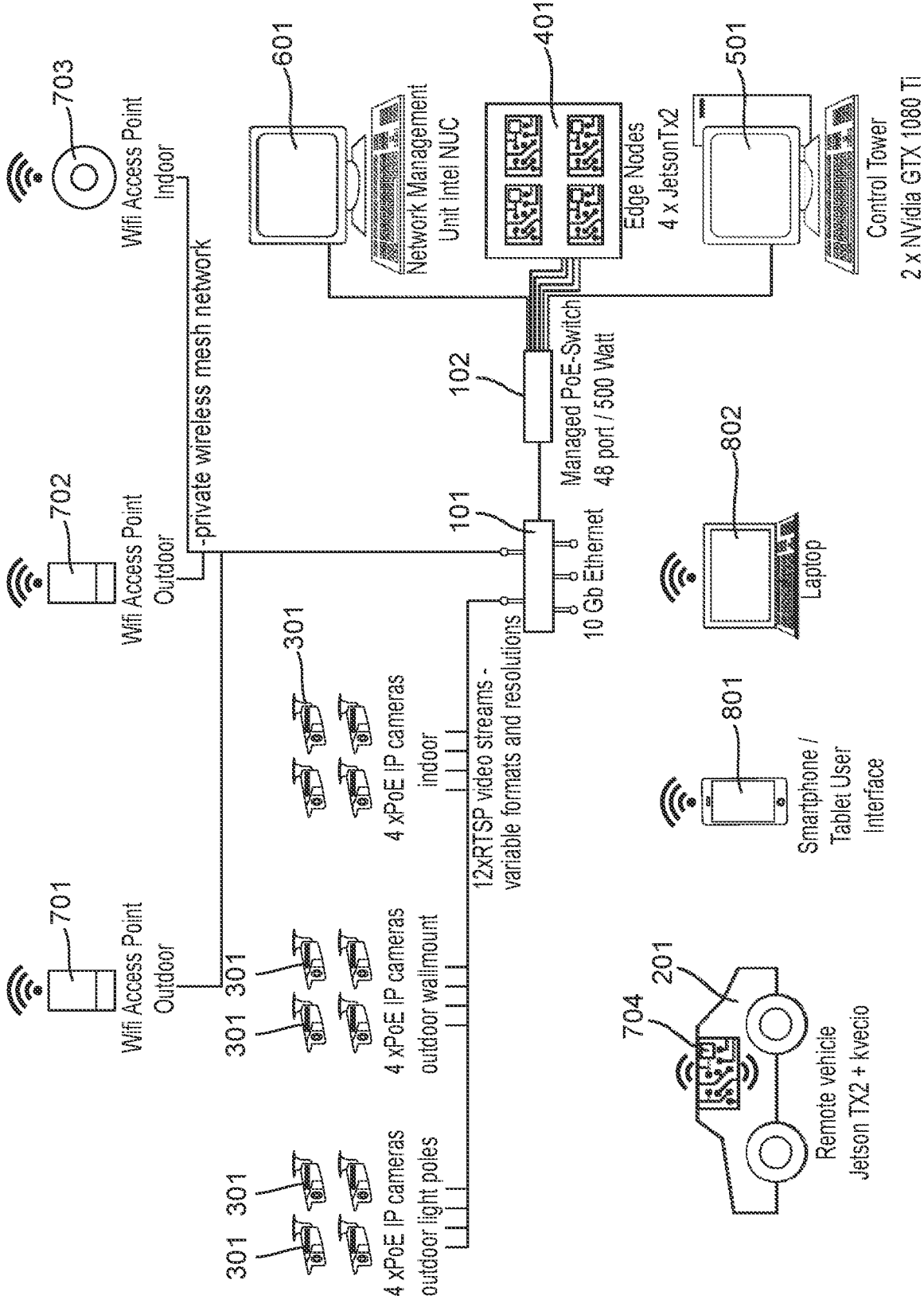

METHOD AND SYSTEM FOR AUTONOMOUS DRIVING OF A VEHICLE

A number of embodiments refer to a method and system for controlling an autonomous vehicle (e.g. a production-line car) in automatic valet parking applications, where the driving control and driving planning are carried out by an external control system by means of artificial intelligence which monitors and controls the vehicle by way of external sensors, in particular camera sensors.

PRIOR ART

Nowadays, the process of parking a vehicle is supported by different assistance systems, e.g. by methods for assisting a driver of a vehicle during a parking process (see inter alia the published patent applications DE102008027692A1, DE102012008858A1 and WO2011154242A1). Furthermore, parking lot recognition is made possible e.g. by a laser scanner (see inter alia the published patent application DE102016120433A1).

Methods which are suitable inter alia for controlling a vehicle independently have been developed worldwide (see inter alia the published patent applications DE102005029336A1 and DE102013003683A1 as well as U.S. Pat. No. 9,701,305B2). However, these methods generally require a large number of sensors on or in the vehicle itself (e.g. laser scanners or radar scanners or cameras)—as well as, frequently, a large computing capacity on or in the vehicle itself.

Nowadays, the process of designing and producing automobiles is subject to massive cost pressures. As a consequence, today's production automobiles do not boast such a huge amount of computational power and/or sensors, meaning that it is frequently impossible to deploy the aforementioned methods. It is for this reason that automatic valet parking on the basis of external sensors and external data processing systems is of particular importance.

DE 10 2009 051 463 B4 discloses a motor vehicle, an external control device and a method for moving a motor vehicle out of a parking space.

Automatic Valet Parking

During fully automated (autonomous) so-called valet parking, a vehicle (e.g. an automobile, a truck, a bus, a fork-lift truck) is parked by its driver at a drop-off point (for example in front of a parking garage) and, from there, the vehicle drives into a parking position and/or returns to the drop-off point on request. Multiple printed published applications (inter alia DE 102012222562A1 as well as WO2016128203A1) show such systems for transporting a vehicle from a starting position into a target position.

Such systems comprise a central computing unit arranged outside of the vehicle for calculating a trajectory, which is also referred to as a movement path within the context of this application, along which the vehicle moves autonomously at a vehicle speed from the starting position into the target position, and a transfer device for transferring the trajectory to the vehicle. The vehicle is driven in a remote-controlled manner by the computing unit located outside the vehicle. These systems can be based, exclusively or partially, on sensors located outside the vehicle and calculate a trajectory on a computing unit located outside the vehicle, which trajectory is then transferred by means of a transfer medium (e.g. Wi-Fi or mobile radio) to the vehicle.

Shortcomings of Automatic Valet Parking Methods

However, such automatic valet parking solutions also have significant shortcomings which counteract or prevent dissemination:

It is an extremely costly process to place and utilize environmental sensors for automatic valet parking methods. The reason for this is that, in the embodiments known to date, novel and expensive sensors (e.g. laser scanners) have to be installed outside of the vehicle in the entire parking area.

The environmental sensor technology for known automatic valet parking methods comprises, in the embodiments known to date, multiple environmental sensors which have to be used to equip a parking lot. Such known environmental sensors are: lidar sensors, ultrasonic sensors, laser sensors, and/or radar sensors.

These sensors have to be procured, mounted, calibrated, maintained and their function regularly checked in order to make safe automated parking possible.

DISCLOSURE

The object which forms the basis of the disclosure is to indicate safe and efficient autonomous driving of a motor vehicle in predefinable surroundings such as, for example, a parking lot, parking garage, an industrial facility, or similar areas. In particular, the aim is to provide an efficient method and system for setting up and operating automatic valet parking methods, which overcome the known disadvantages. This object is achieved by means of the respective subject-matter of the independent claims.

This object is achieved by a method for remote-controlled autonomous driving of a vehicle having the following method steps:

capturing the vehicle with the aid of at least one sensor, in particular camera, arranged in the surroundings of the vehicle, determining a movement path for the vehicle by means of a processing device located outside the vehicle, transmitting the movement path and/or control commands regarding the movement path to the vehicle, and implementing the movement path and/or the control commands in the vehicle, in order to move the vehicle in accordance with the movement path.

In order to capture the vehicle, a clear identification is preferably made, wherein the vehicle outputs light signals which are captured by the at least one sensor and are processed in the processing device. The light signals can in this context be encoded and generated, for example, by actuating the flasher light and/or the brake light and/or the dimmed headlights in a varying or periodical manner. A specific light signal can be assigned by the processing device to each vehicle so that a clear assignment to each vehicle is possible.

A pose of the vehicle is preferably determined by means of the at least one camera, in particular multiple cameras, by the processing device, wherein the pose is in particular projected onto a surroundings map.

Objects, in particular other vehicles or living creatures, are preferably recognized in the surroundings of the vehicle by means of the images or film sequences acquired by at least one camera, whereas an image recognition by means of image comparison and/or, in particular trained, neural networks is performed in the processing device, wherein in particular the movement path and/or control commands, which are transmitted to the vehicle, are adapted.

Multiple cameras are preferably used, wherein the cameras are calibrated, in particular automatically, and/or positioned on a surroundings map, in particular by positioning test bodies which are captured by at least two cameras.

Signals of at least one sensor located inside the vehicle are preferably additionally used in order to control the vehicle.

The movement path and/or control commands regarding the movement path is/are in particular transmitted periodically, in particular adapted to the clock of the bus system located inside the vehicle.

The method for determining the movement path is preferably performed automatically.

The object is further achieved by a system for remote-controlled autonomous driving of a vehicle, in particular in predefinable or predefined surroundings, comprising a plurality of cameras located outside the vehicle, which are configured to capture camera images or videos of at least a part of the surroundings, and a processing device located outside the vehicle, which is configured to process the camera images or videos, wherein the processing device is further designed to recognize at least one vehicle on the basis of the camera images or videos and to determine a movement path for the vehicle, wherein the system further comprises a transfer device which is configured to transmit the movement path and/or control commands regarding the movement path to the vehicle.

The system is preferably designed to guide the vehicle from a starting position automatically and/or autonomously to a target position.

A clear identification of one or more vehicles preferably takes place via an output of light signals of the vehicle or vehicles.

A pose of the vehicle or vehicles can preferably be determined by means of the camera images and/or videos, wherein the pose can in particular be represented on a surroundings map.

In particular, the system comprises an edge computing system which is designed to forward or pass on those camera images or videos, on which the vehicle or vehicles or other objects which are relevant to the movement path exist, in particular in a pre-processed manner, to the processing device.

It is preferably provided that the system uses and/or utilizes, in particular trained or pre-trained, neural networks and/or deep learning and/or reinforcement learning methods, in particular within the meaning of a convolutional neural network. To this end, reference is made to T. Chen, S. Komblith, M. Norouzi, G. Hinton "A Simple Framework for Contrastive Learning of Visual Representations", 2020, https://arxiv.org/pdf/2002.05079.pdf In particular, a deterministic monitoring device is provided, which is in particular configured to verify that components of the system, in particular cameras, the processing device and/or the edge computing system, are in good working order.

According to an aspect, a novel method for operating a vehicle is provided, wherein the vehicle autonomously drives by means of a processing device located outside the vehicle in a parking lot from a starting position to a target position, which is based on already existing sensor technology. According to yet another aspect, a vehicle is provided, which is designed to perform the method. In accordance with a further aspect, a computer program is provided, which comprises program code and/or trained neural networks for performing the method for operating a vehicle if the computer program is run on a computer.

In particular the technical advantage is brought about that the vehicle can park autonomously in a parking garage or in a parking lot, which no longer has to be retrofitted in a cost-intensive and technically complex manner. In particular, the vehicle can be moved safely, inter alia, by sensor technology based on already existing monitoring cameras.

A further technical advantage is that the vehicle does not need to be further equipped by computing units or sensor technology.

A parking lot within the meaning of the present disclosure can also be referred to as a parking area and serves as an area for parking vehicles. The parking lot can, according to an embodiment, be comprised by a parking garage. Autonomous within the meaning of the present disclosure means in particular that the vehicle navigates or drives without an intervention by a driver by means of a remote-s controlled intervention in the parking lot.

A vehicle within the meaning of the present disclosure is e.g. an automobile, a truck, a bus, a fork-lift truck, a people mover, a robot, or similar. The present disclosure also relates to multiple vehicles or a combination of different vehicles.

EMBODIMENTS

1. In an embodiment, it is provided that the parked vehicle moves out of the parking position by means of the processing device located outside the vehicle. The vehicle drives autonomously from the parking position back to the starting position by means of the processing device located outside the vehicle or to a further target position and parks there autonomously by means of the processing device located outside the vehicle. The further target position can be a service station, at which a service is performed on the vehicle. By way of example, the vehicle can be refueled (including electrically), washed, inspected, serviced or repaired at the service station.

2. In accordance with a further embodiment, it is provided that the vehicle is clearly identified by means of the camera sensor technology located outside the vehicle and processing device. Camera sensor technology is also understood, within the context of this application, to be a camera.

3. In accordance with a further embodiment, it is provided that the pose (location and driving direction) of the vehicle is identified by means of the camera sensor technology located outside the vehicle and an external processing device.

4. In accordance with a further embodiment, it is provided that objects (e.g. on the parking area or in the driving range) are recognized and identified by means of the camera sensor technology located outside the vehicle and an external processing device, so that they can e.g. be driven around.

5. In accordance with a further embodiment, it is provided that the camera sensor technology located outside the vehicle and processing device are automatically set up and calibrated. This is effected by an automatic method and system and the distribution of test bodies on the area to be observed. The cameras are calibrated, for example, by image processing and triangulation.

6. In accordance with a further embodiment, it is provided that existing camera sensor technology located outside the vehicle (e.g. already existing monitoring cameras and environmental sensor technology (such as lidar sensors, ultrasonic sensors, laser sensors, or radar sensors)) are automatically combined.

7. In accordance with a further embodiment, it is provided that the processing device located outside the vehicle is constructed to be self-learning.

8. In accordance with a further embodiment, it is provided that camera sensor technology located outside the vehicle is automatically combined with sensors located inside the vehicle (e.g. wheel speed sensors).

EXEMPLARY EMBODIMENTS

Further features of the disclosure will become evident from the description of embodiments according to the disclosure, together with the claims and the appended drawings. Embodiments according to the disclosure can fulfil individual features or a combination of multiple features.

Within the context of the disclosure features which are labeled with "in particular" or "preferably" are to be understood to be optional features.

An aspect provides a method and/or system for remote-controlled autonomous driving of a vehicle in accordance with FIG. 1.

It is provided that the parked vehicle moves out of the parking position by means of the processing device located outside the vehicle, by means of the processing device located outside the vehicle drives autonomously from the parking position back to the starting position or by means of the processing device located outside the vehicle or to a further target position and parks there autonomously by means of the processing device located outside the vehicle. The further target position can be a service station, at which a service is performed on the vehicle. By way of example, the vehicle can be refueled (including electrically), washed, inspected, serviced or repaired at the service station.

A further aspect is a method and/or system for clearly identifying the vehicle by means of camera sensor technology located outside the vehicle and processing device by flashing patterns and further light signals or a sequence thereof.

An aspect is a method and/or system for determining the pose (location and driving direction) of the vehicle exclusively from camera images by means of camera sensor technology located outside the vehicle in an external processing device and projecting said pose of the vehicle onto a map.

A further aspect is a method and/or system for recognizing objects (e.g. on the parking area or in the driving range) by means of the camera sensor technology located outside the vehicle in an external processing device by image comparison and trained neural networks.

An aspect is a method and/or system for automatically calibrating and/or positioning, on a map, the camera sensor technology located outside the vehicle by test bodies which are simultaneously captured by different camera sensors or cameras.

An aspect is a method and/or system for automatically combining camera sensor technology located outside the vehicle of further environmental sensor technology (such as lidar sensors, ultrasonic sensors, laser sensors, or radar sensors).

An aspect is a method and/or system for automatically combining camera sensor technology located outside the vehicle with sensors located inside the vehicle (e.g. wheel speed sensors).

An aspect is an automatically self-learning processing device located outside the vehicle due to the deployment of neural networks and deep learning and/or reinforcement learning methods within the meaning of a convolutional neural network.

An aspect is a method and/or system for calculation and control located outside the vehicle in a non-stationary data processing system in a cloud application.

An aspect is a method and/or system having a control system or a deterministic monitoring device which is designed to perform the method for determining a trajectory automatically.

Exemplary embodiments will be described below without limiting the general concept of the disclosure with reference to the drawings, wherein reference is expressly made to the drawings regarding the details according to the disclosure which are not explained in greater detail in the text, wherein:

One process of the method for operating a vehicle by means of a processing device located outside the vehicle, which is configured as artificial intelligence, provides that the vehicle drives in a remote-controlled manner.

It is provided that the vehicle implements trajectories and driving commands received from a processing device located outside the vehicle and autonomously drives in a parking lot from a starting position to a target position.

According to an embodiment, the starting position is a drop-off position, at which the vehicle can be parked by its driver, so that the vehicle can subsequently perform an autonomous parking process.

According to an embodiment, the target position is a parking position in which the vehicle will park.

According to another embodiment, it is provided that the starting position is a parking position and the target position is a collection position, at which a driver can collect his vehicle following the end of an autonomous parking process.

According to an embodiment, the drop-off position and the collection position are different. According to a further embodiment, the collection position and the drop-off position are identical.

According to an embodiment, it is provided that the vehicle drives by means of a processing device located outside the vehicle from the starting position to a target position and from there to a further target position or drives back to the starting position. The further target position is in particular a collection position.

According to an embodiment, it is provided that the vehicle drives autonomously by means of a processing device located outside the vehicle from the starting position to a parking position, it parks autonomously, moves out of the parking space autonomously later in time by means of a processing device located outside the vehicle and drives back autonomously to the starting position.

According to an embodiment, it is provided that the vehicle drives autonomously in the parking lot based on a digital map of the parking lot by means of a processing device located outside the vehicle.

In an embodiment, it is provided that a vehicle is designed to implement received trajectories and driving commands.

According to an embodiment, the vehicle 201 comprises a vehicle having equipment for the electrical actuator system of steering, drive and brake (e.g. by E-accelerator or drive-by-wire functionality, E-brake, active cruise control, parking assistant or similar) as well as a receiving module (e.g. Wi-Fi or mobile radio). A nominal trajectory, which the vehicle is to follow by means of the control device, is transmitted to the vehicle by means of a processing device located outside the vehicle based on the environmental data and the map of the parking lot.

According to an embodiment, the vehicle 201 is able to compare and/or to fuse the driving commands and trajectories received from a processing device located outside the vehicle with the internal sensors (e.g. wheel rotation angle sensor, wheel speed sensor).

FIG. 1 shows:

a vehicle 201 which is designed to implement received trajectories and driving commands.

monitoring cameras 301 which are suitable for transmitting a video stream (e.g. as RTSP) to the system. The cameras 301 can be PoE IP cameras, being mounted on outdoor light poles, are mounted outdoor on walls and/or are located indoor.

an edge system 401 which is designed to use computer programs (e.g. trained neural networks) for recognizing objects. The edge system 401 can contain edge nodes, i.e. Jetson Tx2.

a control system, which is also referred to as a processing unit, 501, which is designed to perform the method for determining a trajectory and to assign a clear visual pattern to the driven vehicle. The control system 501 can be a Control Tower, having 2 NVidia GTX 1080 Ti.

a network management unit, which is also referred to as a deterministic monitoring device, 601, which is designed to monitor the system, to perform error corrections and to communicate with further systems (e.g. parking garage systems, emergency systems, vehicle production systems) and to perform emergency measures (such as e.g. an emergency stop or a partial or complete system shutdown). The network management unit 601 can contain an Intel NUC.

a communication unit 701, 702, 703, 704 which is designed to transmit trajectories and driving commands to the vehicle. The communication unit can be a outdoor and/or indoor Wifi access point.

a requesting unit 801, 802 which is designed to request the vehicle 201 and/or to start and/or to end the method and to transmit this to the vehicle 201. The requesting unit 801 can be a smartphone or a tablet. The requesting unit 802 can be a laptop.

The edge system 401 or respectively the edge nodes recognize, preferably with the support of the processing device 501, whether a vehicle 201 is in the field of view of one camera 301 or multiple cameras 301. By means of the edge system 401, data from the cameras 301 are consequently selected and forwarded to the processing unit 501 which can see the vehicle 201. In addition, the edge system 401 can serve to recognize other objects or living creatures which newly enter the field of view of a camera 301, and pass on this information to the processing device 501. The edge system 401 can be trained as artificial intelligence for different types of object, as a result of which various reactions can be achieved. If, for example, a child is spotted in the proximity of the autonomously driving vehicle (201), an emergency stop of the vehicle 201 can be initiated. In the event that an inanimate object is discovered, it can be provided that the speed is reduced or the vehicle is steered in another direction or another trajectory or respectively movement path is driven. The corresponding movement paths or respectively trajectories are sent wirelessly via the communication units, configured here as Wi-Fi transmitters and/or receivers (Wi-Fi) 701, 702 or 703, to the vehicle 201 via the communication unit 704. The vehicle 201 can itself supply sensor signals to the system according to the disclosure or respectively processing device 501 or the monitoring device 601 wirelessly via WIFI. As a result, it can be verified whether the vehicle 201 is actually executing the control commands and also observing the movement path or respectively the trajectory. This verification can also be performed by image processing of the images acquired by the cameras 301.

Thanks to the use of the edge system 401, relevant images and/or videos and/or information is/are transmitted to the processing device 501 in order to minimize the usage of the processing device 501 located outside the vehicle. The vehicle 201 can be requested with a smartphone or a tablet 801 or a laptop, for example also via Wi-Fi. Likewise, it can be defined via these requesting units 801, 802 where the respective vehicle 201 is to be driven to autonomously.

The monitoring device 601 checks whether the relevant cameras 301 are in working order. In addition, the monitoring device 601 checks whether system-relevant elements are in working order. In addition, said monitoring device 601 checks without artificial intelligence, that is to say deterministically, whether changes occur in an image, which are not recognized by the processing device 501. In the event that a discrepancy arises between the result of the monitoring device 601 and the processing device 501, the driving range of the vehicle 201 is blocked. Consequently, the monitoring device 601 is a deterministic safety and fallback system.

The movement path or respectively trajectory can be a vector which has, as values, a speed, a steering angle and, for example, the length of time said control parameters are maintained. The movement path or respectively trajectory is adapted on the CAN bus of the vehicle 201 and can be amended, for example, every $25^{th}$ of a second in the case of a CAN bus clocked at 25 Hz. Movement paths or respectively trajectories can be transmitted at this clock speed.

Other vehicles and objects are recognized and categorized in the external processing device. In an embodiment, it is provided that the vehicle halts or stops autonomously if necessary, or that it calculates an evasive course around the vehicles and/or the objects and follows the latter, supported by the external processing device.

In order to clearly identify the vehicles by means of external camera sensors and an external accounting unit, an individual flash code is assigned to the vehicle. An individual flashing pattern is assigned to the vehicles moving simultaneously on the parking area. The visual patterns used can be e.g. flashing patterns or sequences of light signals. Thus, a vehicle can e.g. be clearly identified by 3 alternating flashes to the left and right within 3 seconds by the external camera sensors. This assignment then makes it possible for the control unit to identify and control the vehicle. Within the context of this application, an accounting unit is also understood to be the processing device.

The system determines the pose (location and driving direction) of the vehicle from two-dimensional camera images by means of camera sensor technology located outside the vehicle in an external processing device and projects said pose of the vehicle as a virtual vehicle onto a map of the surroundings.

According to an embodiment, the communication between the vehicle and the external calculation unit is encrypted or the individual driving commands are validated by codes.

In order to efficiently calibrate the camera sensors located outside the vehicle in an automated manner, a calibration system has been developed, in which test bodies are randomly distributed over the parking area to be observed. Thanks to the redundant placement of camera sensors, the text body can therefore captured by more than one camera. If these e.g. same-size but different-colored test bodies (e.g.

yellow, green, red and blue disks or cubes having a diameter of 20 cm) are displaced on the parking area to be observed, the control system 501 can calculate the camera positions, the angle thereof to the observed parking area, as well as the distances thereof from one another and, therefore, position the camera sensors clearly on a map of the parking area to be observed.

In the drawings, the same or similar elements and/or parts are, in each case, provided with the same reference numerals such that they are not introduced again in each case.

Embodiments according to the disclosure may be performed by individual features or a combination of multiple features.

LIST OF REFERENCE NUMERALS

101 Ethernet port
102 Switch
201 Vehicle
301 Monitoring camera
401 Edge system
501 Processing device
601 Monitoring device
701 Communication unit
702 Communication unit
703 Communication unit
704 Communication unit
801 Requesting unit
802 Requesting unit

The invention claimed is:

1. A method for remote-controlled autonomous driving of multiple vehicles, the method comprising:

capturing the vehicles with an aid of at least one sensor arranged in surroundings of the multiple vehicles, assigning, by means of a processing device located outside the multiple vehicles, a different individual flashing pattern to each vehicle of the multiple vehicles moving simultaneously in a designated area, outputting, by each vehicle of the multiple vehicles, a corresponding different individual flashing pattern that is encoded and generated by actuating a flasher light and/or brake light and/or dimmed headlights in a varying or periodic manner, capturing the corresponding different individual flashing pattern of each vehicle of the multiple vehicles, by the at least one sensor, and transmitting the flashing patterns to the processing device, identifying each vehicle of the multiple vehicles, by the processing device, using the corresponding different individual flashing pattern of each vehicle of the multiple vehicles by decoding the individual flashing patterns, determining a movement path for each vehicle of the multiple vehicles by means of the processing device, transmitting at least one of the movement path and control commands regarding the movement path to each vehicle of the multiple vehicles, and implementing at least one of the movement path and the control commands in the vehicles based on the corresponding different individual flashing pattern of each identified vehicle of the multiple vehicles, in order to move the vehicles in accordance with the movement path from a starting position to a target position.

2. The method according to claim 1, wherein a pose of each of the vehicles is determined by means of at least one camera, in particular multiple cameras, by the processing device, wherein the pose is in particular projected onto a surroundings map.

3. The method according to claim 1, wherein objects are recognized in the surroundings of the vehicles by means of images or film sequences acquired at least by one camera, whereas an image recognition by means of image comparison is performed in the processing device, wherein in particular at least one of the movement path and control commands, which are transmitted to the vehicles, are adapted.

4. The method of claim 3, wherein the image comparison is performed using trained neural networks in the processing device.

5. The method according to claim 1, wherein multiple cameras are used, wherein the cameras are at least one of calibrated and positioned on a surroundings map.

6. The method of claim 5, wherein the cameras are calibrated automatically.

7. The method of claim 5, wherein the cameras are positioned on the surroundings map by positioning test bodies which are captured by at least two cameras.

8. The method according to claim 1, wherein signals of at least one sensor located inside each of the vehicles are additionally used in order to control the vehicle.

9. The method according to claim 1, wherein at least one of the movement path and control commands regarding the movement path are transmitted periodically and adapted to a clock of a bus system located inside the vehicles.

10. The method according to claim 1, wherein the method for determining the movement path is performed automatically.

11. The method of claim 1, wherein the at least one sensor comprises at least one camera.

12. A system for remote-controlled autonomous driving of multiple vehicles, in predefinable or predefined surroundings, the system comprising:

a plurality of cameras located outside each of the multiple vehicles, the plurality of cameras being configured to capture camera images or videos of at least a part of the surroundings, at least one sensor arranged in the surroundings of the multiple vehicles, a processing device located outside the multiple vehicles, the processing device being configured to process the camera images or videos, recognize at least one vehicle based on the camera images or videos, and determine a movement path for the vehicle, and a transfer device configured to transmit at least one of the movement path and control commands regarding the movement path to the vehicle, wherein the processing device assigns a different individual flashing pattern to each vehicle of the multiple vehicles moving simultaneously in a designated area, wherein each of the vehicles outputs a corresponding different individual flashing pattern that is encoded and generated by actuating a flasher light and/or brake light and/or dimmed headlights in a varying or periodic manner, wherein the at least one sensor captures the corresponding different individual flashing patterns of each vehicle of the multiple vehicles and transmits the flashing patterns to the processing device, wherein the processing device identifies each vehicle of the multiple vehicles by processing the corresponding different individual flashing pattern of each vehicle, of the multiple vehicles and decoding the individual flashing patterns, and wherein the processing device implements at least one of the movement path and the control commands in the vehicles based on the corresponding different individual flashing pattern of each identified vehicle of the multiple vehicles, in order to move the vehicles in accordance with the movement path from a starting position to a target position.

13. The system according to claim 12, wherein the system is designed to guide the vehicles from a starting position to a target position at least one of automatically or autonomously.

14. The system according to claim 12, wherein a pose of the vehicles can be determined by means of at least one of the camera images or videos.

15. The system of claim 14, wherein the pose is represented on a surroundings map.

16. The system according to claim 12, further including an edge computing system configured to one of either forward or pass on one of either camera images or videos, on which one of either the at least one vehicle or other objects which are relevant to the movement path exist.

17. The system according to claim 16, further including a deterministic monitoring device configured to verify that at least one of cameras, the processing device and the edge computing system, are in good working order.

18. The system of claim 16, wherein the one of either camera images or videos are one of either forwarded or passed on in a pre-processed manner to the processing device.

19. The system according to claim 12, further including at least one of trained or pre-trained, neural networks, deep learning and reinforcement learning methods.

20. The system of claim 19, wherein the neural network comprises a convolutional neural network.

* * * * *